United States Patent [19]

Sugawara et al.

[11] Patent Number: 4,677,358
[45] Date of Patent: Jun. 30, 1987

[54] STEPPING MOTOR DRIVE CONTROLLING CIRCUIT

[75] Inventors: Tadami Sugawara; Masao Okita, both of Furukawa, Japan

[73] Assignee: Alps Electric Co., Ltd., Japan

[21] Appl. No.: 841,874

[22] Filed: Mar. 20, 1986

[30] Foreign Application Priority Data

Mar. 20, 1985 [JP] Japan .............................. 60-40100[U]

[51] Int. Cl.⁴ .............................................. H02P 8/00
[52] U.S. Cl. .................................... 318/696; 318/685; 360/75
[58] Field of Search ................... 318/696, 685; 360/75

[56] References Cited

U.S. PATENT DOCUMENTS 4,594,620 6/1986 Shoji et al. ............................. 360/75

Primary Examiner—William M. Shoop, Jr.
Assistant Examiner—Saul M. Bergmann
Attorney, Agent, or Firm—Guy W. Shoup

[57] ABSTRACT

A controlling circuit for a stepping motor provided on a disk recording and reproducing apparatus which circuit can prevent outputting of a zero track signal in error that may be caused by a stepping error to assuredly step a head to the zero track of a disk. The circuit comprises an excitation initializing circuit which is operable in response to a power on signal and a drive select signal for sequentially switching the exciting mode of the stepping motor from the $\overline{AB}$ phase mode to the AB phase mode.

1 Claim, 4 Drawing Figures

STEPPING MOTOR DRIVE CONTROLLING CIRCUIT

BACKGROUND OF THE INVENTION

This invention relates to a recording and reproducing apparatus for a magnetic disk which is used for an electronic computer, a word processor, and the like, and more particularly to a stepping motor controlling circuit for driving and controlling a stepping motor.

In a recording and reproducing apparatus for a magnetic disk, a stepping motor is rotated to step and position a writing/reading magnetic head to a desired track in order to write information onto the desired track of a magnetic disk or to read information from the desired track. Commonly, a track located at an outermost circumference of a magnetic disk is called zero track and is regarded as a reference track for positioning a head to a desired track.

Typical ones of conventional stepping motor controlling circuits and zero track detecting circuits are illustrated in FIG. 3. Reference numeral 1 denotes a stepping motor of a 2-phase excitation bipolar driving method, and a head (not shown) is moved by one track distance by switching the exciting mode of the stepping motor 1 twice. Reference numeral 2 denotes a driver circuit for driving the stepping motor 1, and 3 an excitation controlling circuit responsive to a stepping signal c from a computer (not shown) to drive the stepping motor 1 and also to a feeding direction signal g for switching the exciting mode of the stepping motor 1. Reference numeral 5 designates a switch circuit for switching a power source to the stepping motor 1 on and off. The switch circuit 5 is triggered by a falling edge of a power on signal a which indicates whether a power source is switched on to the apparatus or not or of a stepping signal d to supply a voltage of 12 V to the driver circuit 2 and also to the stepping motor 1 via the driver circuit 2, but even if a power on signal a is active, when no stepping pulse c is inputted, the switch circuit 5 stops supply of the voltage of 12 V to the stepping motor 1 and the driver circuit 2. The stepping motor 1 has a pair of coils $\phi A$ and $\phi B$, and the exciting mode thereof is determined depending upon a combination of directions of electric currents flowing through the coils $\phi A$ and $\phi B$. Four such combinations are indicated below:

1. AB phase mode ... an electric current flows in a direction of an arrow mark x through the coil $\phi A$ while an electric current flows in a direction of an arrow mark y through $\phi B$;
2. $\overline{A}$B phase mode ... an electric current flows in a direction opposite to the direction of the arrow mark through the coil $\phi A$ while an electric current flows in the direction of the arrow mark y through the coil $\phi B$;
3. $\overline{AB}$ phase mode ... an electric current flows in the direction opposite to the direction of the arrow mark through the coil $\phi A$ while an electric current flows in a direction opposite to the direction of the arrow mark y through the coil $\phi B$; and
4. A$\overline{B}$ phase mode ... an electric current flows in the direction of the arrow mark through the coil $\phi A$ while an electric current flows in the direction opposite to the direction of the arrow mark y through the coil $\phi B$.

A head is stepped between adjacent tracks by sequentially switching the electromagnetic mode twice in response to each stepping pulse c. It is to be noted that the exciting mode at an even numbered track is determined as the AB phase while the exciting mode at an odd numbered track is determined as the $\overline{AB}$ phase.

Meanwhile, reference numeral 7 denotes a zero track sensor for detecting whether the head is positioned on the zero track or not. The zero track sensor 7 includes a light emitting diode D1 and a phototransistor Q1 which are disposed in opposing relationship to each other. An electric current always flows across the anode and the cathode of the light emitting diode D1 to emit light therefrom. The phototransistor Q1 remains on while it receives light from the light emitting diode D1, an electric current flowing across the collector and the emitter of the phototransistor Q1. Reference numeral 8 denotes an inverter which receives an input of a sensor output voltage i, and 9 a NOR gate which receives inputs of an AB phase mode signal h from the excitation controlling circuit 3 and of an sensor output signal j from the inverter 8.

Now, operations of the circuit shown in FIG. 3 will be described with reference to a timing chart of FIG. 4 by way of an example where the head moves from the third track to the zero track. Before a point of time t4, the head is positioned on the third track, and the motor exciting voltage d is not supplied. When a stepping pulse c is produced at the time t4, the motor exciting voltage d is supplied as triggered by a rising edge of the stepping pulse c so that the exciting mode of the stepping motor 1 is changed over from the $\overline{AB}$ phase mode at the third track to the AB phase mode at the second track through the $\overline{A}$B phase mode. While the exciting mode remains in the AB phase mode, the AB phase mode signal h from the excitation controlling circuit 3 becomes an active low level from a high level. Then, when a second stepping pulse c appears at a time t5, the exciting mode is changed over to the $\overline{AB}$ phase mode at the first track through the $\overline{A}$B phase. In the meantime, since part of a carriage (not shown) on which the head is mounted comes between the light emitting diode D1 and the phototransistor Q1 to begin to intercept light to be received by the phototransistor Q1 from the light emitting diode D1, the output voltage i of the zero track sensor 7 gradually rises, and when the output voltage i exceeds a predetermined level (2 V), the sensor output signal j changes from a high level to a low level via the inverter 8. In other words, the sensor output signal j is switched to an active low level at a stage when the head comes to the first track. Finally, when a third stepping pulse c appears at a time t6, the exciting mode is changed over to the AB phase mode at the zero track through the $\overline{A}$B phase mode. When the exciting mode thus becomes the AB phase mode, the AB phase mode signal h again becomes an active low level. Thereupon, since the AB phase mode signal h and the sensor output signal j both become an active low level, the zero track signal k which is an output of the NOR gate 9 becomes an active high level. Thus, the zero track signal k of the high level which indicates that the head is currently positioned on the zero track is transmitted to the computer.

As described above, in the conventional arrangements, the exciting modes at the zero and first tracks are the AB phase and the $\overline{AB}$ phase, respectively, and are thus different from each other, but the output signals j of the zero track sensor 7 at both tracks are both active. Meanwhile, a control IC (a gate array) not shown has a characteristic that when a power source which was once turned off is again turned on, the control IC initializes the exciting mode of the stepping motor 1 to the AB phase mode. However, if the power is turned on while the head remains positioned on the first track, since the exciting modes at the zero track and the second track are both the AB phase mode, the stepping motor 1 cannot be stepped from the $\overline{AB}$ phase mode to the AB phase mode in either direction. Accordingly, it is a problem that since the AB phase mode signal h and the output signal j of the zero track sensor 7 are both at an active low level although the head remains actually positioned on the first track, the zero track signal k becomes an active high level which indicates that the head is positioned on the zero track.

SUMMARY OF THE INVENTION

It is an object of the present invention to provide a stepping motor controlling circuit wherein if a power source is turned on when a head is positioned on the first track, the head can assuredly be stepped to the zero track, without outputting a zero track signal in error.

In order to attain the object described above, according to the present invention, a drive controlling circuit for a stepping motor 1 which is provided on a disk recording and reproducing apparatus having provided thereon a zero track sensor 7 for detecting a zero track of a disk and which is driven a desired stepping amount by sequentially switching driving currents supplied to a stepping motor by an excitation controlling circuit 3 is characterized in that it comprises an excitation initializing circuit 4 responsive to a power on signal a and a drive select signal b for switching the exciting mode of the stepping motor 1 to the exciting mode at the zero track.

The technical means described above will act as follows: if a power source is turned on when a head is positioned on the first track and then a drive select signal b becomes active, the exciting mode is switched by an excitation initializing circuit 4 from the $\overline{AB}$ phase mode to the AB phase mode through the $\overline{AB}$ phase mode. Thus, since the excitation of the $\overline{AB}$ phase mode is passed on the way of switching from the $\overline{AB}$ phase mode to the AB phase mode, the head can be assuredly stepped from the first track to the zero track.

DETAILED DESCRIPTION OF THE PREFERRED EMBODIMENT

Figure 1:
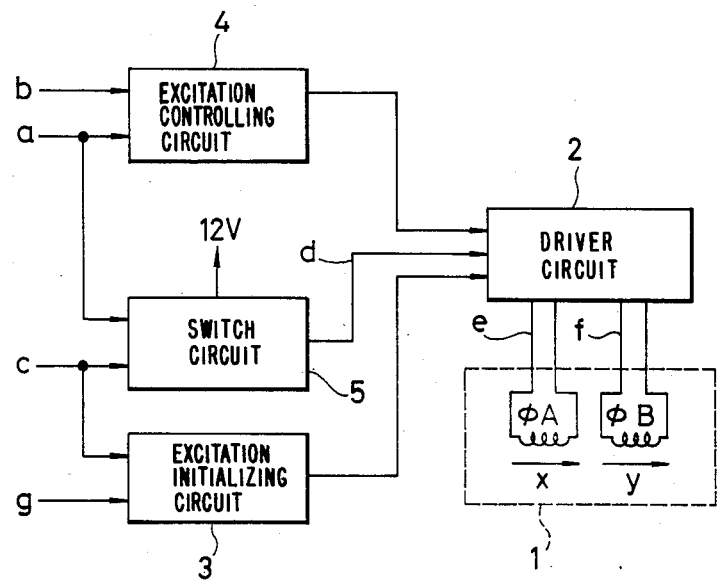
FIG. 1 is a circuit diagram illustrating an embodiment of a stepping motor controlling circuit according to the present invention.

The present invention will be described in detail below by way of an example of a preferred embodiment thereof. FIG. 1 is a circuit diagram illustrating an embodiment of a stepping motor controlling circuit according to the present invention. Referring to FIG. 1, like elements are designated by like reference numerals to those of the conventional arrangement, and detailed description thereof will be omitted herein. Reference numeral 4 denotes an excitation initializing circuit which is operable in response to a power on signal a from a computer (not shown) and a drive select signal b indicating that a present recording/reproducing apparatus is selected for sequentially switching the exciting mode of the stepping motor 1 from the $\overline{AB}$ phase mode to the AB phase mode.

Figure 2:
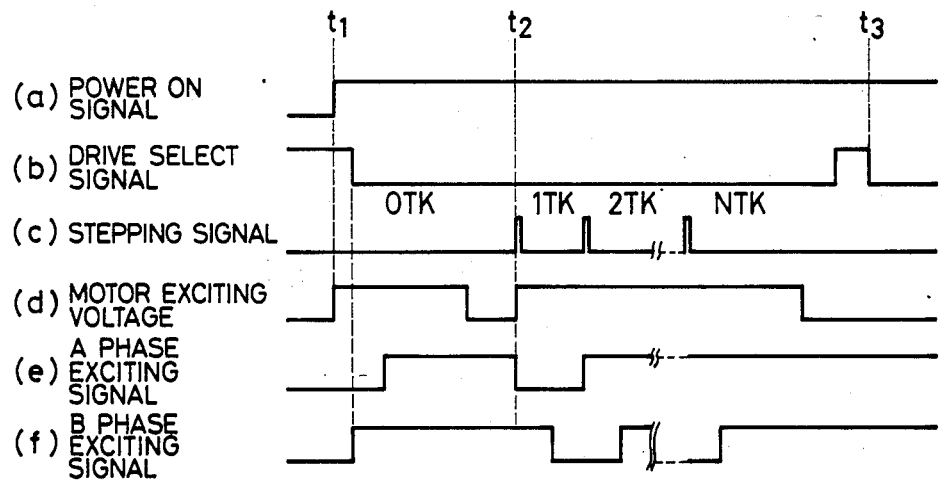
FIG. 2 is a timing chart illustrating conditions of several portions of the circuit of FIG. 1.
Figure 3:
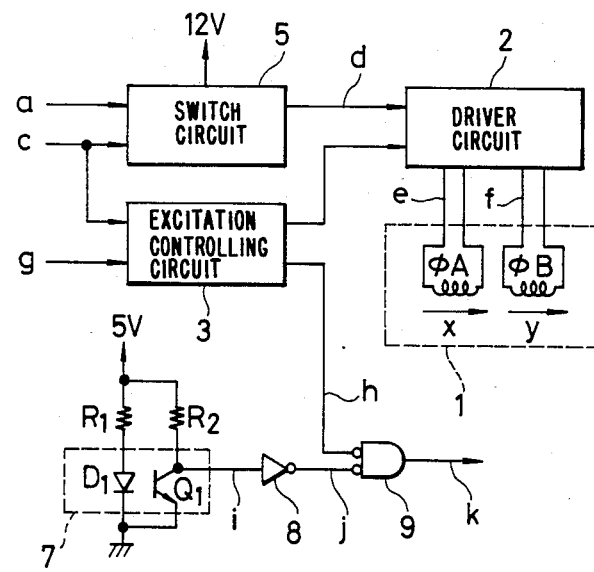
FIG. 3 is a circuit diagram illustrating a conventional stepping motor controlling circuit.
Figure 4:
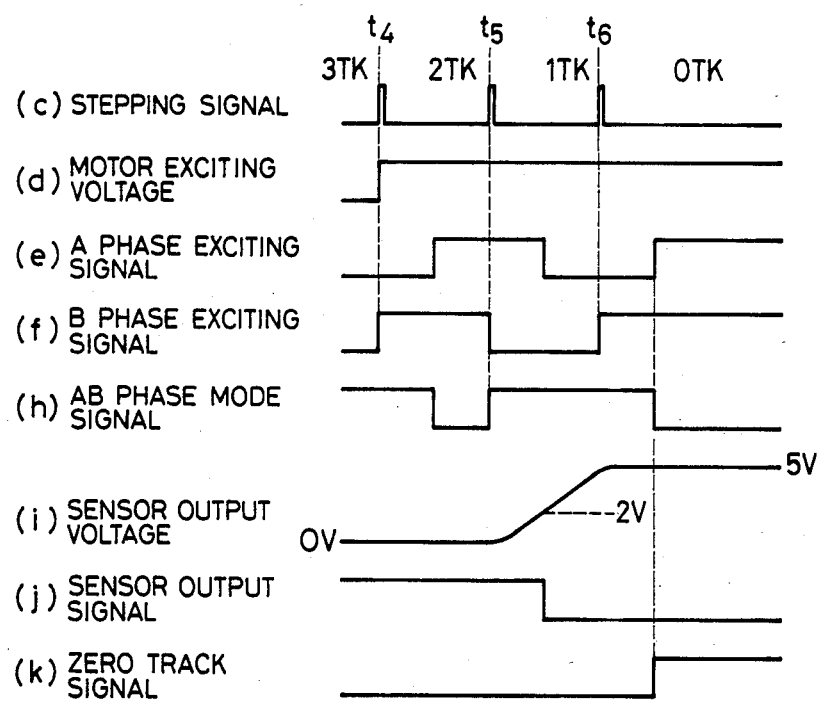
FIG. 4 is a timing chart illustrating conditions of several portions of the circuit of FIG. 3.

Now, operations of the circuit shown in FIG. 1 will be described with reference to a timing chart of FIG. 2. The timing chart illustrates an example wherein the power source is turned on when the head is positioned on the first track and thereafter the head seeks from the zero track to the Nth track. If the power is thrown in at a time t1 when the head is positioned on the first track, the motor exciting voltage d becomes a high level as triggered by a rising edge of the power on signal a so that a voltage of 12 V is applied to the driver circuit 2 and hence to the stepping motor 1 via the driver circuit 2 by the switch circuit 5. Then, as the drive select signal b becomes a high level to an active low level at a somewhat delayed timing, the exciting mode of the stepping motor 1 is switched from the $\overline{AB}$ phase mode to the $\overline{AB}$ phase mode and then to the AB phase mode by an action of the excitation initializing circuit. At this instant, the head is stepped from the first track to the zero track. Since the exciting mode of the stepping motor 1 is repetitively switched by one mode in this manner, the stepping motor 1 can assuredly follow such switchings of the exciting mode. Then, after lapse of a predetermined interval of time after the exciting mode is switched to the AB phase mode, supply of the voltage of 12 V is stopped.

When a stepping pulse c is produced after lapse of a time t2 after the head has been stepped to the zero track, the motor exciting voltage d again becomes the high level, and thus the exciting mode of the stepping motor 1 is switched sequentially like AB→$\overline{A}$B→$\overline{AB}$→A$\overline{B}$ →AB→...→A$\overline{B}$→AB so that the head seeks from the zero track to the Nth track. After lapse of a predetermined interval of time after completion of seeking of the head to the Nth track, the motor exciting voltage d becomes a low level, stopping application of the voltage of 12 V.

After then, the drive select signal b becomes the high level, and then even if the drive select signal b is changed again to the active low level at a time t3, the excitation initializing circuit 4 does not effect a excitation switching operation. In other words, the excitation initializing circuit 4 operates only when the drive select signal g is first changed active after the power on signal a becomes active.

As described above, if the power source is turned on when the head is positioned not only on the first track but also at any odd numbered track, the excitation initializing circuit 4 switches the exciting mode like $\overline{AB}$→$\overline{A}$B→AB to step the head to a next outer even numbered track.

Meanwhile, if the power source is turned on when the head is positioned on any even numbered track, the excitation initializing circuit 4 switches the exciting mode like AB→A$\overline{b}$→AB, and hence the head will come back again to the initial track position after it is one stepped a half track distance inwardly. As a result, the head does not move from its position.

It is to be noted that the type, the number of coils, the exciting manner, and the like, of the stepping motor are not limited to those of the present embodiment.

As apparent from the foregoing description, according to the present invention, a stepping motor controlling circuit comprises a excitation initializing circuit operable in response to a power on signal and a drive select signal for sequentially switching the exciting mode of a stepping motor from the $\overline{AB}$ phase mode to the AB phase mode. Accordingly, even if a power source is turned on when a head is positioned on the first track of the $\overline{AB}$ phase mode, the head can be assuredly stepped to the zero track of the AB phase mode. Accordingly, the stepping motor controlling circuit according to the invention exhibits an effect that it can prevent outputting of a zero track signal in error which may be caused by a stepping error.

What is claimed is:

1. In a controlling circuit for a two-phase bipolar stepping motor for driving a magnetic head to a desired track of a number of tracks defined on a magnetic disk of a disk drive apparatus, the motor having two coils A and B which are excited for driving the head a desired stepping amount by sequentially switching driving currents to the coils through an AB phase mode, in which it steps to a zero or an even numbered track, an intermediate $\overline{AB}$ phase mode, an $\overline{AB}$ phase mode, in which it steps to an odd numbered track, and an intermediate $A\overline{B}$ phase mode, the controlling circuit including a switch circuit responsive to a power-on signal for turning on a power voltage of a power source for the apparatus, an excitation controlling circuit responsive to a stepping signal indicating a desired track stepping operation and to a stepping direction signal from an associated computer for providng a motor exciting signal, and a driver circuit responsive to the motor exciting signal and the power voltage being turned on for driving the motor, a zero track sensor for providing a detection signal when the head is moved to the zero track, and means responsive to an AB phase mode signal provided by the excitation controlling circuit and the detection signal for providing a zero track signal for transmission to the associated computer, the improvement comprising an excitation initializing circuit responsive to the power-on signal generated when the power is first turned on and a drive select signal from the associated computer for providing a signal to the driver circuit for switching the stepping motor to the AB phase mode of the zero track, whereby if a power-on signal is provided when the head is located in the first track and the motor is in an $\overline{AB}$ phase mode, an erroneous zero track signal is not transmitted to the computer and the motor is stepped from the $\overline{AB}$ phase mode, through the $\overline{AB}$ phase mode, to the AB phase mode of the zero track.

* * * * *